(12) United States Patent
Shioji (10) Patent No.: US 10,328,524 B2
(45) Date of Patent: Jun. 25, 2019

(54) COAXIAL NOZZLE OF LASER BEAM MACHINE

(71) Applicant: AMADA COMPANY, LIMITED, Kanagawa-ken (JP)

(72) Inventor: Naruaki Shioji, Kanagawa (JP)

(73) Assignee: AMADA COMPANY, LIMITED, Kanagawa-Ken (JP)

( * ) Notice: Subject to any disclaimer, the term of this patent is extended or adjusted under 35 U.S.C. 154(b) by 195 days.

(21) Appl. No.: 14/383,214

(22) PCT Filed: Mar. 13, 2013

(86) PCT No.: PCT/JP2013/056924
§ 371 (c)(1),
(2) Date: Sep. 5, 2014

(87) PCT Pub. No.: WO2013/137289
PCT Pub. Date: Sep. 19, 2013

(65) Prior Publication Data
US 2015/0048071 A1 Feb. 19, 2015

(30) Foreign Application Priority Data

Mar. 14, 2012 (JP) .................................. 2012-056824
Feb. 27, 2013 (JP) .................................. 2013-036541

(51) Int. Cl.
*B23K 26/14* (2014.01)
*B23K 26/21* (2014.01)
*B23K 26/70* (2014.01)

(52) U.S. Cl.
CPC .......... *B23K 26/21* (2015.10); *B23K 26/1476* (2013.01); *B23K 26/1488* (2013.01); *B23K 26/703* (2015.10)

(58) Field of Classification Search
CPC ...... B23K 3/085; B23K 37/003; B23K 26/21; B23K 26/703; B23K 26/1476; B23K 26/1488
(Continued)

(56) References Cited

U.S. PATENT DOCUMENTS 4,609,812 A * 9/1986 Drexler .................. G06K 19/12
235/487
4,906,812 A * 3/1990 Nied .................... B23K 1/0056
219/121.63
(Continued)

FOREIGN PATENT DOCUMENTS

DE 3637568 5/1988
DE 102008025044 B3 9/2009
(Continued)

OTHER PUBLICATIONS

Search report from International Patent Appl. No. PCT/JP2013/056924, dated May 28, 2013.
(Continued)

*Primary Examiner* — Darren W Gorman
*Assistant Examiner* — Christopher R Dandridge
(74) *Attorney, Agent, or Firm* — Greenblum & Bernstein, P.L.C.

(57) ABSTRACT

A coaxial nozzle of a laser beam machine has an inner nozzle in which a laser beam and an inner gas are passing through an inner side, an outer nozzle provided at an outer side of the inner nozzle, and a cooling circuit for cooling the inner nozzle.

10 Claims, 5 Drawing Sheets

(58) Field of Classification Search
USPC ............ 219/121.84, 121.12, 121.21, 121.27, 219/121.85, 121.6, 121.68, 121.7, 121.63
See application file for complete search history.

(56) References Cited

U.S. PATENT DOCUMENTS

| | | | | |
|---|---|---|---|---|
| 4,997,250 A | * | 3/1991 | Ortiz, Jr. ................ | B23K 26/06 219/121.75 |
| 5,477,025 A | * | 12/1995 | Everett ................ | B23K 26/144 219/121.63 |
| 5,763,855 A | | 6/1998 | Shioji | |
| 7,605,345 B2 | * | 10/2009 | Fukuda ................ | B23K 26/147 219/121.84 |
| 8,872,057 B2 | * | 10/2014 | Krzeminski .......... | H01J 23/033 204/241 |
| 2002/0179582 A1 | * | 12/2002 | Reichmann ........ | B23K 26/0665 219/121.84 |

FOREIGN PATENT DOCUMENTS

| | | | | |
|---|---|---|---|---|
| JP | 3-243292 | | 10/1991 | |
| JP | 4-2353 | | 1/1992 | |
| JP | 7-68382 | | 3/1995 | |
| JP | 07-185874 | | 7/1995 | |
| JP | 10-137964 | | 5/1998 | |
| JP | 11-123578 | * | 5/1999 | ............. B23K 26/06 |
| JP | 411123578 | * | 5/1999 | ............. B23K 26/06 |
| JP | 11-226770 | * | 8/1999 | ............. B23K 26/06 |
| JP | 2002-001569 | | 1/2002 | |
| JP | 2006-212689 | * | 8/2006 | ............. B23K 26/06 |

OTHER PUBLICATIONS

Search Report issued by E.P.O. patent office in E.P.O. Patent Application No. 13760979.8, dated Dec. 23, 2015.
Office Action issued in Japan Counterpart Patent Appl. No. 2013-036541, dated Jan. 30, 2017 , along with an english translation thereof.

* cited by examiner

COAXIAL NOZZLE OF LASER BEAM MACHINE

TECHNICAL FIELD

The present invention relates to a coaxial nozzle of a laser beam machine, and in particular to one that is equipped with a cooling circuit of a nozzle.

BACKGROUND TECHNIQUE

Figure 2:
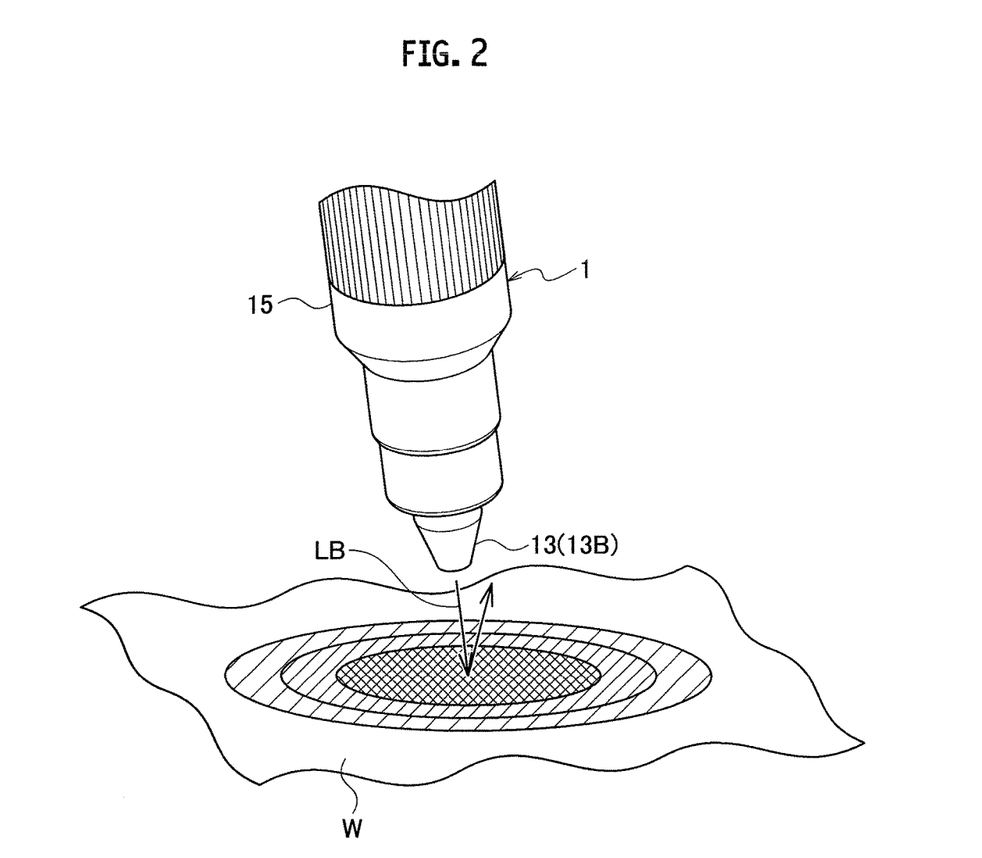
FIG. 2 is a perspective view showing a situation at a time of the use of a coaxial nozzle of a laser beam machine that is inclined with respect to a machining surface of a work.

Conventionally, a coaxial nozzle for a laser (a laser nozzle) 200 is inclined by 10° to 20° with respect to a machining surface of a work W, in order to prevent a reflected light from a welded portion from damaging a laser oscillator and its optical system by returning to a laser oscillator and its optical system, at a time of welding a work (see FIG. 2).

Note that the patent document 1 and the patent document 2 can be listed as the documents related to the prior art.

PRIOR ART DOCUMENT

Patent Document

Patent Document 1: Japanese Patent Application publication No. H7-68382
Patent Document 2: Japanese Patent Application publication No. H4-2353

SUMMARY OF THE INVENTION

By the way, the occurrence of the damage at the laser oscillator and its optical system can be prevented by inclining the laser nozzle, but there is a problem that the laser nozzle is going to be overheated as the reflected light from the machining surface of the work is going to hit the laser nozzle.

The present invention is achieved in view of the above noted problems, and has an object of providing a coaxial nozzle of a laser beam machine capable of preventing the coaxial nozzle from being overheated even when a reflected light from a machining surface of a work hits the coaxial nozzle, by the use of the coaxial nozzle of the laser beam machine which is inclined with respect to the machining surface of the work, so as to prevent the occurrence of the damage at the laser oscillator and its optical system.

A coaxial nozzle of a laser beam machine according to the present invention is characterized by having an inner nozzle in which a laser beam and an inner gas are passing through an inner side along an axial direction from a base end side to a tip end side, an outer nozzle coaxial with said inner nozzle and provided at an outer side of said inner nozzle, and a cooling circuit for cooling said inner nozzle.

EMBODIMENTS FOR IMPLEMENTING THE INVENTION

In the following, one embodiment of the present invention will be described with reference to the drawings.

First, a schematic configuration of a head 3 for a laser beam machining in which a coaxial nozzle 1 of a laser beam machine according to the present embodiment is being adopted will be described. The present laser beam machine is a laser beam welding machine for welding a work by using a laser beam, for example.

Figure 1:
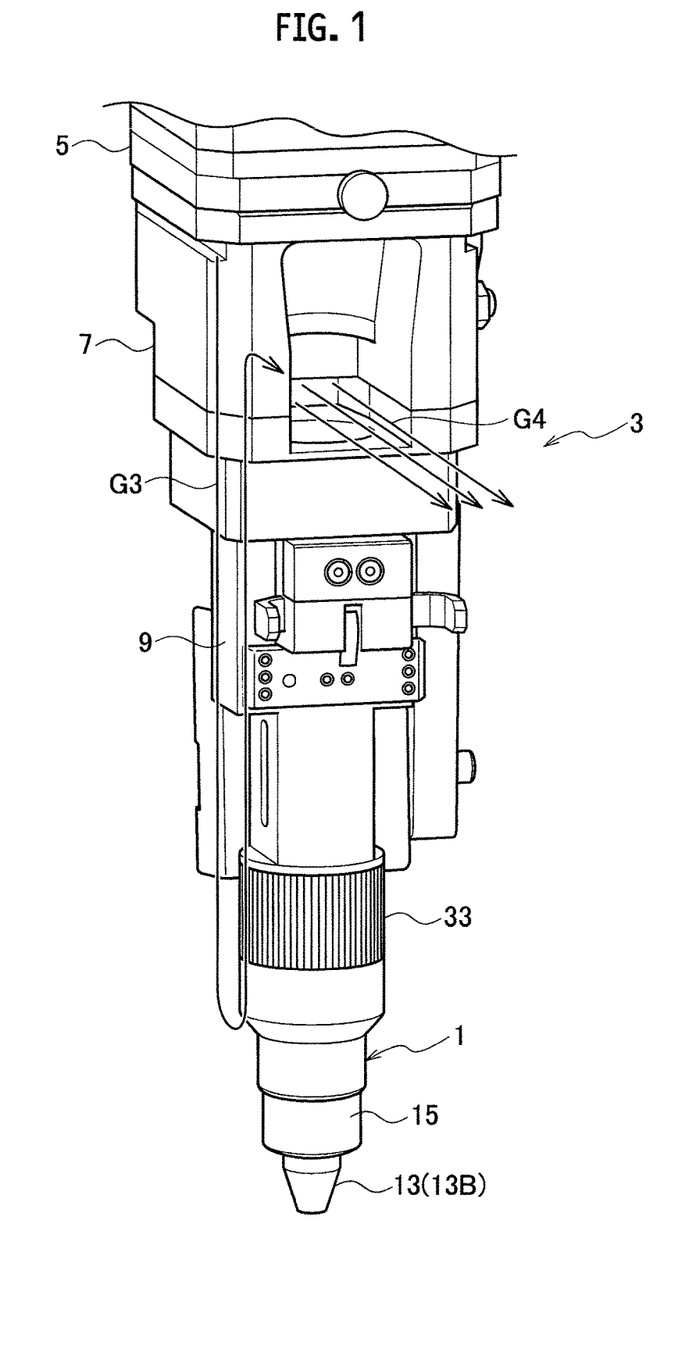
FIG. 1 is a perspective view showing a schematic configuration of a head for a laser beam machining in which a coaxial nozzle of a laser beam machine according to one embodiment of the present invention is being adopted.
Figure 4:
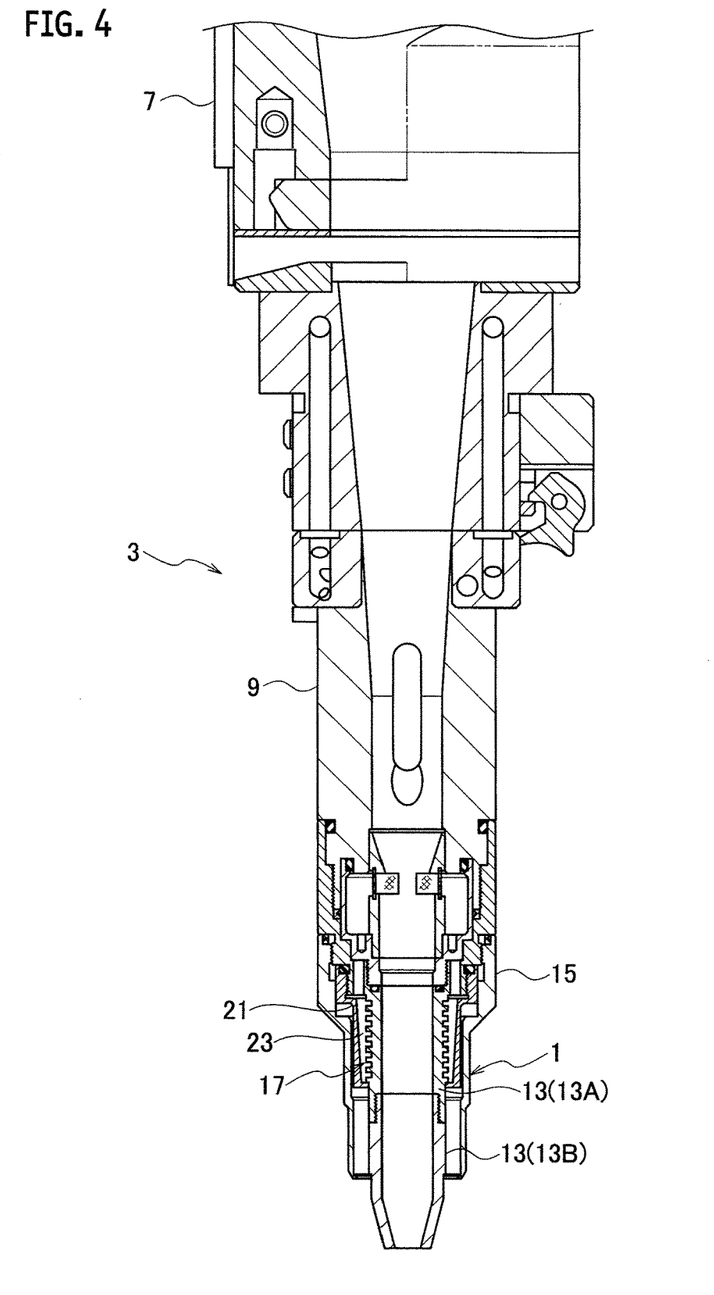
FIG. 4 is a cross sectional view showing a schematic configuration of a head for a laser beam machining in which a coaxial nozzle of a laser beam machine according to one embodiment of the present invention is being adopted.

As shown in FIG. 1 and FIG. 4, the head 3 for a laser beam machining is equipped with an optical element support member 5, a cross jet assembly member 7, a nozzle base 9, and a coaxial nozzle (a coaxial nozzle of a laser beam machine) 1.

Here, for convenience, an extending direction of a central axis of the head 3 for a laser beam machining is set as a Z-axis direction, and one end side in this Z-axis direction is set as a base end side (an upper side) and the other end side is set as a tip end side (a lower side).

The optical element support member 5 is located at the base end portion side of the head 3 of the laser beam machining, and on a tip end of the optical element support member 5, the cross jet assembly member 7 is provided integrally. Also, on a tip end of the cross jet assembly member 7, the nozzle base 9 is provided integrally, and on a tip end of the nozzle base 9, the coaxial nozzle 1 is provided integrally.

The optical element support member 5 is one that supports an optical element such as a condensing lens for condensing the laser beam. Also, the cross jet assembly member 7 is one that generates an air curtain G4 of a cross jet gas G3 for protecting the optical element such as the condensing lens that is provided at the optical element support member 5 (see FIG. 1).

A laser beam LB emitted by a laser oscillator not shown in the figure is passing through an interior (a central axis and its surrounding) of the head 3 for the laser beam machining, propagating from the base end side to the tip end side in the Z-axis direction, and emitted from the coaxial nozzle 1 and irradiated onto the work W (see FIG. 2).

Here, the coaxial nozzle 1 will be described in detail. The coaxial nozzle 1 is equipped with an inner nozzle 13, an outer nozzle 15, and a cooling circuit 17.

The inner nozzle 13 is formed in a tubular shape (for example, a cylindrical shape), and the laser beam LB and an inner shield gas (inner gas) G1 that is supplied to a machining portion of the work W due to the laser beam LB are passing in an inner side. By means of this, the inner nozzle 13 emits the laser beam LB toward the work W from the tip end, while ejecting the inner shield gas G1 toward the machining portion of the work W (see FIG. 3).

On the inner side of the inner nozzle 13, because the laser beam passes through there, it is not possible to attach a rectifying means (such as a mesh for a gas lens) for laminarizing a flow of the inner shield gas G1. For this reason, as will be described later, a component for realizing a laminarization is arranged at a location not obstructing the passing of the laser beam (a side of a space through which the laser beam passes).

The inner shield gas G1 is a gas that is supplied to the machining portion of the work W in order to prevent the oxidation of the work W irradiated by the laser beam and remove plasma that is generated there. As this inner shield gas G1, an inert gas such as nitrogen gas or argon gas, for example, is mainly used. The plasma is a vapor of the work W (a metal vapor in the case where the work W is a metal) that is evaporated by the laser beam.

The outer nozzle 15 is formed in a tubular shape (for example, a cylindrical shape), and linked integrally to the inner nozzle 13 at an outer side of the inner nozzle 13. Also, the outer nozzle 15 is surrounding the inner nozzle 13 such that a space (a gap) 19 of a tubular shape (for example, a cylindrical shape) is formed at the outer side of the inner nozzle 13, and made such that an outer shield gas (outer gas) G2 is flowing where the space 19 of a tubular shape is, and the outer shield gas G2 is ejected from the tip end (see FIG. 3).

The outer shield gas G2 is a gas that is supplied around the machining portion in order to prevent the oxidation of the machining portion of the work W irradiated by the laser beam, for example. As the outer shield gas G2, an inert gas such as nitrogen gas or argon gas, for example, is mainly used.

The space 19 of a tubular shape between the outer nozzle 15 and the inner nozzle 13 is not a portion through which the laser beam passes, so that a usual laminarization component (such as a mesh 27 for a gas lens) can be installed, and the outer shield gas G2 can be ejected along the inner nozzle 13 in a laminarized state.

Note that the central axis of the inner nozzle 13 and the central axis of the outer nozzle 15 are coincident with an axis of the head 3 for laser beam machining. The head 3 for laser beam machining is made to irradiate the laser beam onto the work W with the axis of the coaxial nozzle 1 inclined by 10° to 20° with respect to a straight line perpendicular to the machining surface of the work W in planar shape, similarly as the conventional case (see FIG. 2).

The cooling circuit 17 is one that cools an outer circumference of the inner nozzle 13. The cooling circuit 17 cools the outer circumference of the inner nozzle 13 by using a cross jet gas G3 which is a gas different from the inner shield gas G1 and the outer shield gas G2 mentioned above. The cross jet gas G3 is a gas for protecting an optical system such as a condensing lens through which the laser beam passes, from sputters generated by the laser beam machining.

Note that, as mentioned above, the cross jet gas G3 used for the cooling at the cooling circuit 17 protects the optical system such as the condensing lens by forming the air curtain G4 (between the optical system of the optical element support member 5 and a laser beam irradiated portion of the work W) with the cross jet assembly member 7.

Namely, it is possible to blow off the sputters and the like of the welding entered into the inner nozzle 13 by the cross jet gas G3, and make the sputters and the like of the welding not to attach to the condensing lens and a window for lens protection of the optical element support member 5. A route of the cross jet gas G3 is schematically shown in FIG. 1.

Also, at the cooling circuit 17, a space (a space of a tubular shape such as a cylindrical shape, for example) 23 through which only the cross jet gas G3 flows is formed, by installing an intermediate tubular member 21 of a cylindrical shape, for example, in the space (a gap) 19 of a cylindrical shape between the inner nozzle 13 and the outer nozzle 15.

This space 23 is surrounding at least a part of the outer circumference of the inner nozzle 13. Note that the intermediate tubular member 21 is installed integrally with the inner nozzle 13.

Also, the head 3 for laser beam machining is configured such that the outer nozzle 15 and the other constituent members (the optical element support member 5, the cross jet assembly member 7, the nozzle base 9, and the like) are invisible, as blocked by the inner nozzle 13 (in particular, a tip end side inner nozzle 13B to be described below), from the machining portion of the work W to be irradiated by the laser beam emitted from the coaxial nozzle 1. Of course, they are made to be invisible even in the case of machining with the axis of the coaxial nozzle 1 inclined by 10° to 20° with respect to a straight line perpendicular to the machining surface of the work W in planar shape.

The coaxial nozzle 1 will be described in further detail.

Figure 3:
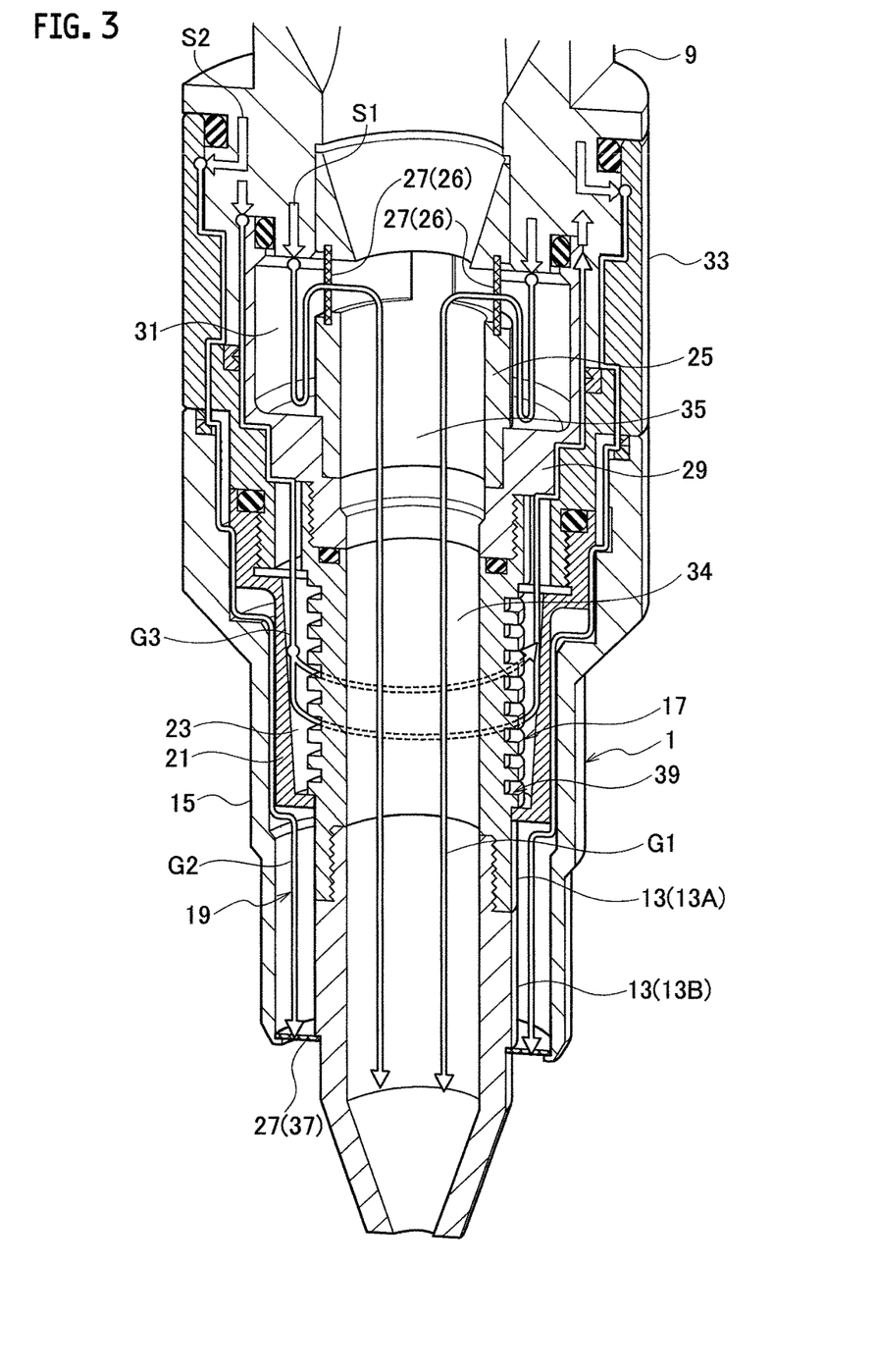
FIG. 3 is a cross sectional perspective view showing a schematic configuration of a coaxial nozzle of a laser beam machine according to one embodiment of the present invention.
Figure 5:
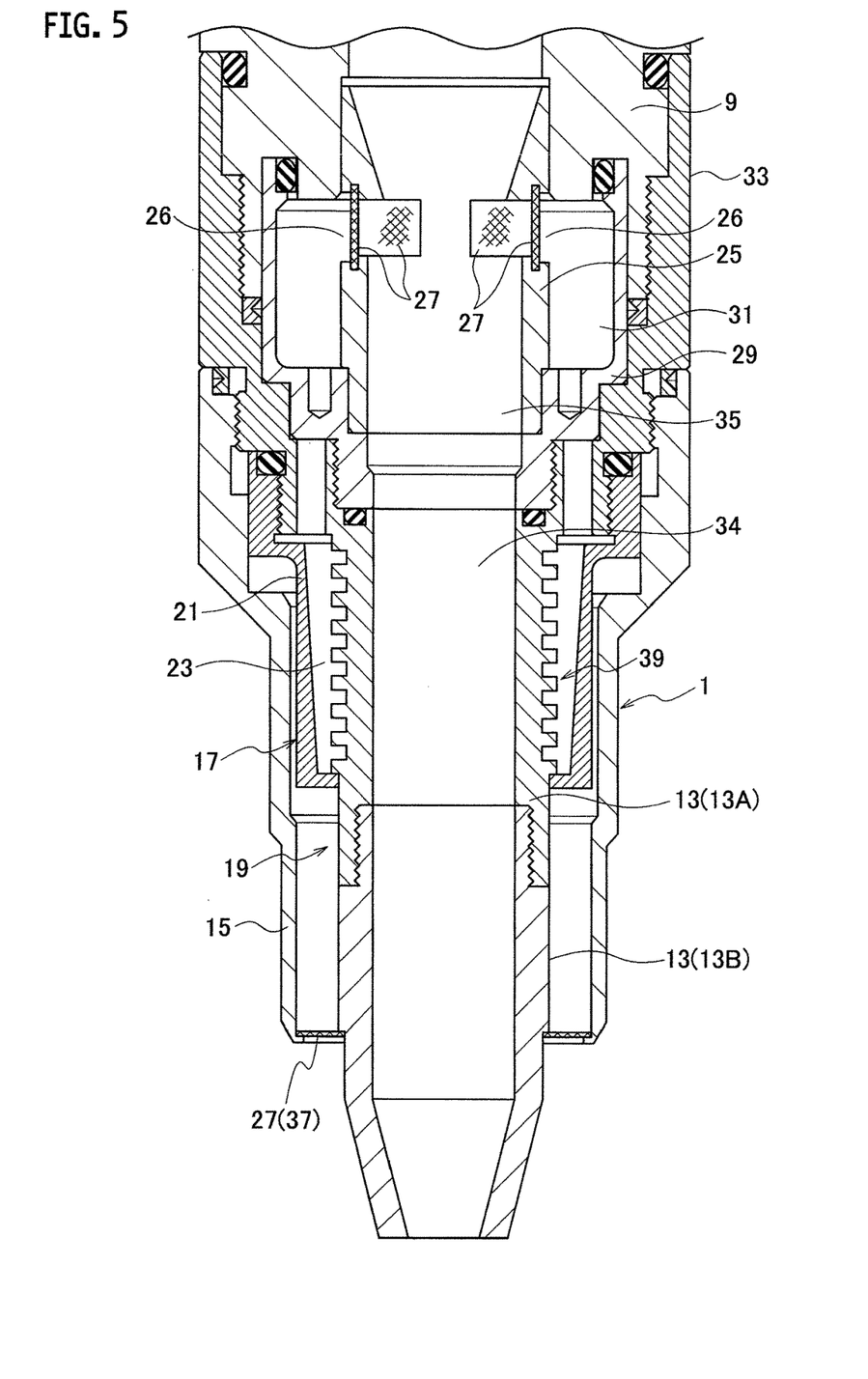
FIG. 5 is a cross sectional view showing a schematic configuration of a coaxial nozzle of a laser beam machine according to one embodiment of the present invention.

As shown in FIG. 3 and FIG. 5, on a tip end (a lower end) of the nozzle base 9, a mesh support member 25 of a cylindrical shape is provided as a tubular component in fluid communication with a space 34 on an inner side of the inner nozzle 13. Also, on an outer side of that mesh support member 25, a partition 29 of a cylindrical shape with a diameter larger than the mesh support member 25 is provided. Moreover, on an outer side of this partition 29, a nozzle holder 33 of a cylindrical shape with a diameter larger than the partition 29 is provided.

The partition 29 is one that partitions another space in an interior of the space 19 of the cylindrical shape on an inner side of the outer nozzle 15. As that another space, an inner gas chamber 31 of a cylindrical shape is secured between the mesh support member 25 and the partition 29.

On an upper portion circumferential wall of the base end side of the mesh support member 25, a plurality of supply ports 26 for supplying the inner shield gas G1 to the space 34 on an inner side of the inner nozzle 13 are provided. These supply ports are configured by notches. Then, to these supply ports 26, a metallic mesh 27 for a gas lens as a rectifying means, or rectifier, for laminarizing a flow of the inner shield gas G1 to be supplied to the space 35 on an inner side of the inner nozzle 13 is provided. In other words, a location on the base end (upper end) side of the inner gas chamber 31 is in fluid communication with the space 35 on an inner side of the mesh support member 25 (a space in fluid communication with the space 34 on an inner side of the inner nozzle 13), through the mesh 27.

The mesh 27 in this case may be provided in a form of a arc surface or a rectangular plane for each supply port 26, or may be provided in a cylindrical shape or a polygonal shape to cover all of the supply ports 26. Also, the orientation of the supply ports 26 and the mesh 27 may be set to be oriented obliquely in a nozzle tip end direction, rather than setting it in a direction orthogonal to the axis of the mesh support member 25.

In other words, the supply ports 26 and the mesh 27 may be provided to be inclined in a range not affecting the passing of the laser beam, by about 0° to 30°, for example, rather than providing them to be parallel with respect to the axis of the mesh support member 25. In the case of doing that, it is made possible to suppress the amount of the inner shield gas G1 that flows out from a nozzle upper portion (an opening at a center of the nozzle base 9 and the mesh support member 25) to be less.

In the case of arranging the mesh 27 that is the rectifying means for the laminarization on a side of the spaces 34 and 35 through which the laser beam passes in this way, the laser reflected light from the work will not going to hit the mesh 27 directly, and it is possible to prevent the damage of the mesh 27 due to the reflected light. Also, it is possible to reduce the damage (such as an attachment and a perforation) due to the sputters.

Note that, as the rectifying means for the laminarization, it is also possible to use a sintered filter or a urethane wool and the like, instead of the mesh 27, On an outer side of a circumferential wall of the mesh support member 25 having the supply ports 26, the inner gas chamber 31 in an annular shape described above is formed, and on an upper portion of that inner gas changer 31, an inflow port (a tip end of an arrow S1 in FIG. 3) in which the inner shield gas G1 inflows into the inner gas chamber 31 is provided.

Then, the inner shield gas G1 that passed through a flow passage (not shown in the figure) provided in the nozzle base 9 is passing through the inner gas chamber 31, the mesh 27 and the space 35, ejected from a tip end of the inner nozzle 13 via the space 34 in an interior of the inner nozzle 13, and supplied to the machining portion of the work W.

Here, the first shield gas supply means S1 (indicated for convenience by an arrow in FIG. 3) is configured by the means including a flow passage of this inner shield gas G1.

In this case, at least a part of the inner shield gas G1 that passed through the flow passage (not shown in the figure) provided in the nozzle base 9 and reached to the inner gas chamber 31 hits an inner surface of a tip end side of the inner gas chamber 31 (an inner bottom surface of the inner gas chamber 31), changes the direction to the base end side once, and passes through the mesh 27. As the direction of the gas flow is reversed in this way, the inner shield gas G1 that is inflowing from the inflow port is ejected to the supply port 25 after the fluid energy at a time of inflowing is attenuated. Consequently, the flow rate and the non-uniformity of the inner shield gas G1 are lessened, and after that, it is introduced into the inner nozzle 13 in a laminarized state by passing though the mesh 27.

Note that, by filling the urethane wool and the like to the interior of the inner gas chamber 31, the effects of the inner gas chamber 31 to slow down the flow rate and correct the non-uniformity of the flow rate can be made higher.

Also, the total area of the supply ports 26 in which the mesh 27 is provided is set to be smaller than a sum of an upper end release port and a lower end release port of the inner nozzle 13, and it is made possible to supply a necessary flow amount of the inner shield gas G1 at less than or equal to an upper limit speed to become a laminar flow within the inner nozzle 13. For this reason, the inner shield gas G1 that is introduced into the inner nozzle 13 can maintain the laminar flow state even when ejected from the tip end of the inner nozzle 13 while changing the direction. This upper limit speed is calculated from the Reynolds number and the like.

On a tip end of the partition 29, a base end side inner nozzle 13A of a cylindrical shape that is integral to a nozzle holder 33 is linked. Then, on a tip end of the base end side inner nozzle 13A, a tip end side inner nozzle 13B of a tubular shape which is tapered as its tip becomes a conical shape is connected. When one made of carbon is used for example as this tip end side inner nozzle 13B, it is possible to suppress the attachment of the sputters.

In this way, the inner nozzle 13 is configured from the base end side inner nozzle 13A of the cylindrical shape and the tip end side inner nozzle 13B. Then, as it becomes a calibration in which the tip end side inner nozzle 13B is screwed into the base end side inner nozzle 13A, it is possible to exchange the tip end side inner nozzle 13B easily.

Note that, in the present embodiment, the nozzle holder 33 and the base end side inner nozzle 13A are configured integrally. In other words, a tip end side of the nozzle holder 33 is becoming the base end side inner nozzle 13A that forms a part of the inner nozzle 13.

The intermediate tubular member 21 has a diameter larger than a diameter of the inner nozzle 13. This intermediate tubular member 21 is provided at a tip end of the nozzle holder 33, and covers the base end side inner nozzle 13A. Between the intermediate tubular member 21 and the base end side inner nozzle 13A, the space 23 in the cylindrical shape is formed.

Then, the cross jet gas G3 that has passed through the flow passage not shown in the figure cools the base end side inner nozzle 13A by passing through the space 23, returns to the cross jet assembly member 7 by passing through another flow passage not shown in the figure, and generates the air curtain G4 of the cross jet gas G3 in order to protect the optical element such as the condensing lens.

Note that, on an outer circumference of the base end side inner nozzle 13A, fins 39 in which a larger outer diameter portion and a smaller outer diameter portion are formed to be arranged alternately in the axial direction are provided. By means of these fins 39, the cooling efficiency of the base end side inner nozzle 13A by the cross jet gas G3 is made higher.

The outer nozzle 15 has a diameter larger than diameters of the inner nozzle 13 and the intermediate tubular member 21. This outer nozzle 15 is provided at a tip end of the nozzle holder 33, and covers a part of the intermediate tubular member 21, the base end side inner nozzle 13A and the tip end side inner nozzle 13B (a part of the base end side).

Then, the outer shield gas G2 that has passed through the flow passage not shown in the figure is passed via the space 19 in the cylindrical shape that is secured between the outer nozzle 15 and the inner nozzle 13, passed through the mesh 27 for a gas lens that is provided at an opening 37 of a tip end of the outer nozzle 15, and ejected in the laminar flow state toward a surrounding of the machining portion of the work W.

Here, the second shield gas supply means S2 (an arrow S2 in FIG. 3) is configured by the means including a flow passage for supplying the outer shield gas G2 to the space 19 in the cylindrical shape that is secured between the outer nozzle 15 and the inner nozzle 13.

According to this coaxial nozzle 1, the cooling circuit 17 for cooling the inner nozzle 13 is provided near a heat source (the machining portion of the welded portion and the like in the work W), so that the overheat of the inner nozzle 13 can be prevented even when the reflected light from the machining surface of the work W hits the inner nozzle 13 by the use of the coaxial nozzle 1 of the head 3 for laser beam machining that is inclined with respect to the machining surface of the work W. Also, even when the output of the laser beam is raised, the overheat of the inner nozzle 13 can be prevented without using a cooling water. Moreover, as the inner nozzle 13 is cooled, the outer nozzle 15 is also cooled due to the heat conduction, so that the overheating is prevented.

Also, according to this coaxial nozzle 1, the outer circumference of the inner nozzle 13 is cooled by using the cross jet gas G3, so that the coaxial nozzle 1 can be cooled with a simple configuration without newly adding a medium for cooling. Also, the cross jet gas G3 is used so that the running cost required for the cooling of the coaxial nozzle 1 can be reduced.

Also, according to this coaxial nozzle 1, the space 23 in which only the cross jet gas G3 flows (the space for cooling the inner nozzle 13) is formed by the intermediate tubular member 21, so that the flows of the shield gases (the inner shield gas, the outer shield gas) G1 and G2 are not disturbed, and it is easy to keep the concentrations of the shield gases G1 and G2 at the machining portion of the work W to be desired values.

Also, according to this coaxial nozzle 1, it is configured such that the outer nozzle 15 is invisible from the machining portion of the work W to be irradiated by the laser beam LB emitted from the coaxial nozzle 1 of the head 3 for laser beam machining, so that the outer nozzle 15 is not going to be damaged by the reflection of the laser beam LB, and the exchange of the outer nozzle 15 becomes unnecessary.

Note that, in the present embodiment, the inner nozzle 13 is cooled by using the cross jet gas G3, but it may be configured to cool the inner nozzle 13 by using a coolant (a cooling water, a cooling air) instead of (or in addition to) the cross jet gas G3.

Also, according to this coaxial nozzle 1, on a circumferential wall of a tubular component (the mesh support member 25) that is in fluid communication with an interior of the inner nozzle 13, the supply ports 26 for supplying the inner shield gas G1 to the space 34 in an interior of the inner nozzle 13 are provided, and on an outer side of that circumferential wall, the inner gas chamber 31 having the supply ports 26 and the inflow port, for ejecting the inner shield gas G1 that is inflowing from the inflow port after the fluid energy at a time of inflowing is attenuated is secured. Consequently, it is possible to slow down the flow rate of the inner shield gas G1 that is supplied into the inner nozzle 13 from the supply ports 26 while it is possible to correct the non-uniformity of flow rate. In other words, the flow of the inner shield gas G1 that is supplied in an inner side of the inner nozzle 13 through the mesh 27 provided at the supply ports 26 can be made to be a stable laminar flow state.

Also, according to this coaxial nozzle 1, the inner shield gas G1 is supplied into the inner nozzle 13 in the laminar flow state via the mesh 27 as a gas lens from the supply ports 26 formed on the circumferential wall of the mesh support member 25. Consequently, the interior of the inner nozzle 13 through which the laser beam passes and the interior of the tubular component (the partition 29) that is in fluid communication with it can be left completely empty as a space without an obstacle, and the passing of the laser beam is not going to be obstructed.

Also, according to this coaxial nozzle 1, a passage area of the supply ports 26 and the mesh 27 is set to be smaller than a sum of an opening minimum cross sectional area of the tip end side of the inner nozzle 13 (a cross sectional area of a tip end opening of the tip end side inner nozzle 13B) and an opening minimum cross sectional area of the base end side (a cross sectional area of a minimum diameter portion of the mesh support member 25 for example that is on an upper side of the mesh 27). Consequently, it is possible to supply a necessary flow amount of the inner shield gas G1 at less than or equal to an upper limit speed to become a laminar flow within the inner nozzle 13. For this reason, the inner shield gas G1 that is introduced into the inner nozzle 13 can be ejected in the laminar flow state from the tip end of the inner nozzle 13 while changing the direction.

Consequently, even in the case of using the inner nozzle 13 of a large diameter, it is possible to supply the shield gas of a high purity in the laminar flow to the machining portion of the work W.

Also, according to this coaxial nozzle 1, the flows of the inner shield gas G1 and the outer shield gas G2 that are passing through an inner side and an outer side of the inner nozzle 13 are made to be the laminar flows, so that it is possible to securely block the involvement of oxygen in the atmosphere. As a result, it is possible to make the heat resistant strength higher by suppressing the heat deterioration of the tip end side inner nozzle 13B, even in the case where the tip end side inner nozzle 13B is overheated as the reflected light from the machining surface of the work W hits the tip end side inner nozzle 13B, by the use of the coaxial nozzle 1 of the laser beam machine that is inclined with respect to the machining surface of the work W, so as to prevent the occurrence of the damage at the laser oscillator and its optical system.

In particular, in the case where the tip end side inner nozzle 13B is made of carbon with a good sputter releasability, the carbon is going to cause the wear and the lowering in strength as it is oxidized in a vicinity of 400° C. in the atmosphere, but by using the inert gas as the shield gas, the heat resistance strength of the carbon portion can be made higher than or equal to 2000° C., so that a lifetime of the tip end side inner nozzle 13B can be extended.

INDUSTRIAL UTILIZABILITY

According to the present invention, an effect that it is possible to prevent the overheating of the coaxial nozzle, even when the reflected light from the machining surface of the work hits the coaxial nozzle, by the use of the coaxial nozzle of the laser beam machine that is inclined with respect to the machining surface of the work, so as to prevent the occurrence of the damage at the laser oscillator and its optical system, is achieved.

The invention claimed is:

1. A coaxial nozzle of a laser beam machine comprising:
    an inner nozzle in which a laser beam and an inner gas pass through an inner side along an axial direction from a base end side to a tip end side of the inner nozzle, where the inner gas is ejected,
    an outer nozzle coaxial with the inner nozzle and surrounding an outer side of the inner nozzle such that a tubular shaped space between the inner nozzle and the outer nozzle is provided, an outer gas flows in the tubular shaped space and is ejected along the inner nozzle, and
    a cooling circuit provided around an outer circumferential wall of the inner nozzle, and having two longitudinal sections provided along the outer circumferential wall of the inner nozzle in the axial direction and a transverse section joining the longitudinal sections and partially surrounding the outer circumferential wall of the inner nozzle such that a cross jet gas flows from one of the longitudinal sections via the transverse section to another one of the longitudinal sections, for cooling an outer circumference of the inner nozzle, the cooling circuit defined by an inner circumferential wall of an intermediate tubular member and the outer circumferential wall of the inner nozzle, the intermediate tubular member being provided in the tubular shaped space between the inner nozzle and the outer nozzle and defines a portion of the tubular shaped space in which only the cross jet gas flows such that the flow of the inner gas and the outer gas is not disturbed, the cross jet gas flowing in the cooling circuit being distinct from the inner gas and from the outer gas and does not mix with the inner gas or with the outer gas.

2. The coaxial nozzle according to claim 1, wherein the inner nozzle is configured such that the outer nozzle is invisible from a machining portion of a work on which the laser beam emitted from the inner nozzle is to be irradiated.

3. The coaxial nozzle according to claim 1, wherein
a supply port that supplies the inner gas to an inner side of the inner nozzle is provided at a base end side of a cylindrical component in fluid communication with the inner nozzle or an interior of the inner nozzle,
an inner gas chamber having an inflow port of the inner gas ejects a fluid energy of the inner gas, inflowing from the inflow port, from the supply port after attenuating, at the tip end side, is provided on an outer side of the inner nozzle or the cylindrical component, and
a rectifier that laminarizes a flow of the inner gas to be supplied to an inner side of the inner nozzle is provided at the supply port.

4. The coaxial nozzle according to claim 3, wherein a passage area of the supply port is smaller than a sum of an opening minimum cross sectional area of the tip end side and an opening minimum cross sectional area of the base end side of the inner nozzle.

5. The coaxial nozzle according to claim 1, wherein fins, in which outer diameter portions of different diameters are arranged alternately in the axial direction, are provided on the outer circumferential wall of the inner nozzle.

6. The coaxial nozzle according to claim 1, wherein the cooling circuit includes a conduit that maintains the cross jet gas distinct from the inner gas.

7. The coaxial nozzle according to claim 1, wherein the cooling circuit includes a conduit that maintains the cross jet gas distinct from the outer gas.

8. The coaxial nozzle according to claim 1, the cooling circuit is configured such that the cross jet gas is ejected in a direction opposite from an ejection direction of the inner gas and outer gas.

9. The coaxial nozzle according to claim 1, wherein the outer gas is ejected from the outer nozzle at a larger distance from a workpiece than a distance at which the inner gas is ejected from the inner nozzle.

10. The coaxial nozzle according to claim 1, wherein the cooling circuit is configured such that the cross jet gas is ejected from a cross jet assembly member provided in a head for the laser beam machine along with an optical element support member, to generate an air curtain of the cross jet gas for protecting an optical element provided in the optical element support member.

* * * * *